United States Patent
Saliba

(10) Patent No.: US 7,105,086 B2
(45) Date of Patent: Sep. 12, 2006

(54) STORM DRAIN CAPTURE AND CONTAINMENT DEVICE

(75) Inventor: B. George Saliba, New Kensington, PA (US)

(73) Assignee: Alcoa Inc., Pittsburgh, PA (US)

( * ) Notice: Subject to any disclaimer, the term of this patent is extended or adjusted under 35 U.S.C. 154(b) by 32 days.

(21) Appl. No.: 11/046,930

(22) Filed: Jan. 31, 2005

(65) Prior Publication Data

US 2006/0169625 A1    Aug. 3, 2006

(51) Int. Cl.
   *E03F 5/14* (2006.01)
(52) U.S. Cl. ............ 210/163; 210/170; 210/265; 210/538; 210/532.1; 404/2; 404/4; 405/36; 405/50
(58) Field of Classification Search ........ 210/163, 210/164, 170, 265, 299, 538, 532.1; 404/2, 404/4, 5; 405/36, 50
See application file for complete search history.

(56) References Cited

U.S. PATENT DOCUMENTS

| | | | |
|---|---|---|---|
| 283,369 A * | 8/1883 | Bartlett | 404/2 |
| 809,201 A * | 1/1906 | Lutz | 404/4 |
| 838,450 A * | 12/1906 | Redemeyer | 404/4 |
| 1,654,247 A * | 12/1927 | Egan | 210/164 |
| 3,862,039 A * | 1/1975 | Summers | 210/170 |
| 4,261,823 A | 4/1981 | Gallagher et al. | 210/164 |
| 4,296,884 A * | 10/1981 | Luebke | 210/170 |
| 4,299,697 A * | 11/1981 | Curati, Jr. | 210/170 |
| 4,717,284 A * | 1/1988 | Gress | 405/50 |
| 4,988,235 A * | 1/1991 | Hurley | 210/164 |
| 5,297,367 A | 3/1994 | Sainz | 52/12 |
| 5,498,331 A * | 3/1996 | Monteith | 210/538 |
| 5,744,048 A | 4/1998 | Stetler | 210/803 |
| 5,746,911 A * | 5/1998 | Pank | 210/532.1 |
| 5,849,198 A | 12/1998 | Sharpless | 210/693 |
| 5,855,774 A | 1/1999 | Boelter | 210/155 |
| 6,080,307 A | 6/2000 | Morris et al. | 210/163 |
| 6,099,723 A | 8/2000 | Morris et al. | 210/170 |
| 6,106,707 A | 8/2000 | Morris et al. | 210/163 |
| 6,132,603 A * | 10/2000 | Mokrzycki et al. | 210/163 |
| 6,146,051 A | 11/2000 | Pratt | 404/2 |
| 6,221,243 B1 | 4/2001 | Flanagan | 210/163 |
| 6,231,758 B1 | 5/2001 | Morris et al. | 210/163 |
| 6,428,692 B1 | 8/2002 | Happel | 210/155 |
| 6,468,942 B1 | 10/2002 | Sansalone | 502/402 |
| 6,503,390 B1 | 1/2003 | Gannon | 210/164 |
| 6,537,446 B1 | 3/2003 | Sanguinetti | 210/163 |
| 6,569,321 B1 * | 5/2003 | Coffman | 210/170 |

* cited by examiner

*Primary Examiner*—Christopher Upton
(74) *Attorney, Agent, or Firm*—Greenberg Traurig LLP; Harry A. Hild, Jr.

(57) ABSTRACT

A storm drain system (10) contained in the ground (36) contains a standpipe (12) having a bottom section (18) having perforations (20) where a porous pavement (22) surrounds the top portion of the standpipe (12), where, beneath the porous pavement is a substructure of coarse aggregate, all surrounded by a non-porous base material (34), such as concrete, where a storm drain (28) connects to the standpipe by a top outlet pipe (30), where water (38, 40) and liquid impurities (42) are separated from storm water runoff by a non-perforated section of the standpipe.

11 Claims, 2 Drawing Sheets

STORM DRAIN CAPTURE AND CONTAINMENT DEVICE

FIELD OF THE INVENTION

The present invention relates to an in place device and surrounding media that can capture and contain small oil or gasoline spills of up to about 25 gallons (94.6 liters) allowing retrieval by pumping rather than discharge into local waters.

BACKGROUND OF THE INVENTION

Storm water that falls on paved streets or parking lots is usually gravity passed to a variety of catch basins, generally buried in the ground, as taught, for example by U.S. Pat. Nos. 5,744,048; 5,297,367 and 4,261,823 (Morris et al., Stetler, Sainz, and Gallagher et al., respectively). Most of these catch basins are buried in ground, conventional asphalt pavement, concrete or the like, and many have interior filters to control/catch hydrocarbons or the like which may be washed into the catch basin by rain water or the like.

It is the possibility of the catch basin passing a mixture of vapor plus oil, gasoline or chemicals from a spill into local waters that presents a problem. FIG. 1 of U.S. Pat. No. 6,099,723 (Morris et al.) is particularly illustrative of this problem. Many of the catch basins have top grates, usually of metal, such as U.S. Pat. No. 6,221,243B1 (Flanagan), while others, such as U.S. Pat. No. 6,146,051 (Pratt) utilize a perforated/pervious paving layer covering a deep bed of crushed stone or the like surrounded by impervious walls. Additional patents in this area include U.S. Pat. Nos. 6,231,758B 1; 6,106,707 and 6,080,307 (all Morris et al.).

What is needed is containment of leaks of 1 to 2 gallons (3.8 liters to 7.6 liters) of oil, gasoline or the like at a time from mobile vehicles, so that discharge into the surrounding environment is avoided. Typically, if there are reports of a leak, spill response crews are dispatched to try and contain the leak before it enters a storm drain. It is a main object of this invention to provide such a containment system that can be easily emptied by spill response crews.

SUMMARY OF THE INVENTION

The above needs are met and problems solved by providing a storm drain system, in place in the ground, for receiving water and liquid impurities insoluble in water, comprising (a) a standpipe positioned/disposed within the drain system, the standpipe having a top section having a top outlet pipe and a bottom perforated section; (b) porous pavement material surrounding the top area of the storm drain system; (c) a non-porous base material deposited in the ground and surrounding the porous pavement material and providing a base for holding the standpipe and porous pavement in place in the ground; where the top outlet pipe of the standpipe connects to a storm drain, so that water would permeate the porous pavement, and the water would enter the perforations at the bottom of the standpipe.

If liquid impurities had a specific gravity less than water, they would settle on the top of the water outside the standpipe, within supportive aggregate under the porous pavement, until the water and impurities are pumped out of the system. If the liquid impurities had a specific gravity greater than water they would settle below the water, at the bottom of the standpipe, and could still be pumped out of the standpipe. The system could also contain a release of about 25 gallons of a material whose density is less than water and about 25 gallons of a material whose density was greater than that of water. Almost all spills, 90% to 95%, will have a density less than water.

Any water already in the standpipe would usually be displaced by the impurities. A pump or vacuum devise can be used periodically to remove the impurities. Typical impurities could be gasoline, hydrocarbon chemicals or oil. The impurities will most usually have a specific gravity less than water, about 0.95 at 20° C. vs water at 4° C. (which equals 1.000). The porous pavement is preferably from about 20 vol. % to about 35 vol. % porous and the non-porous base material can be concrete or the like.

DETAILED DESCRIPTION OF PREFERRED EMBODIMENTS

Figure 1:
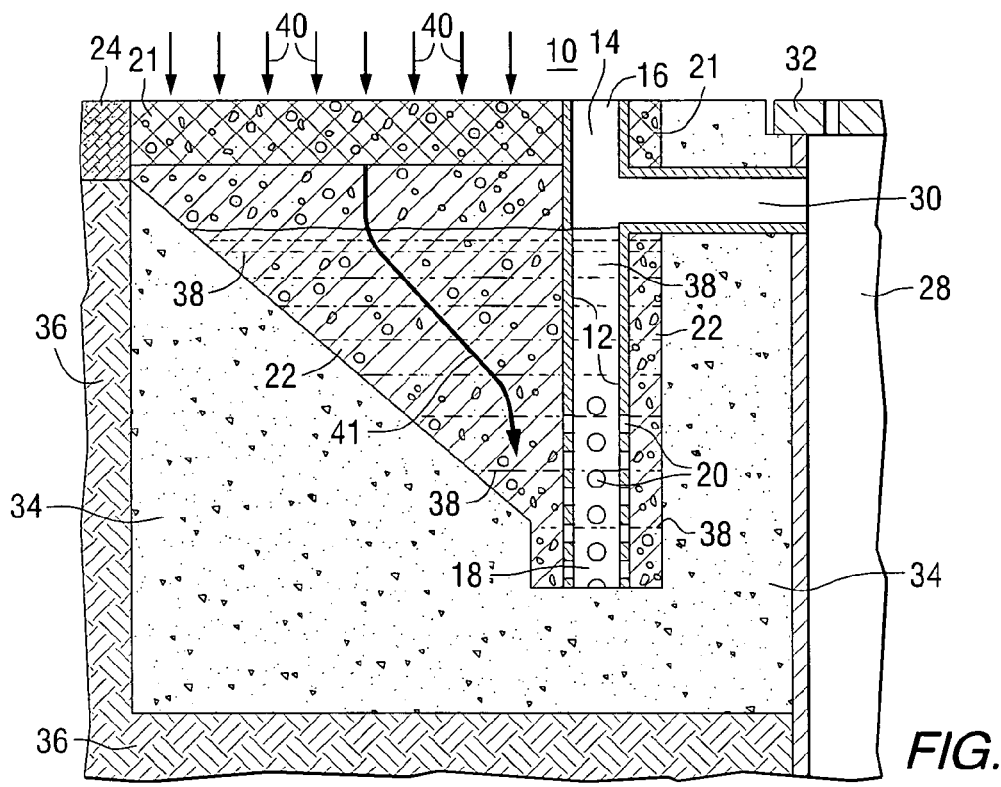
FIG. 1, which best illustrates the invention, is a cross-sectional view of a storm drain system showing an in place standpipe, containing uncontaminated storm water, below ground level, surrounded by porous pavement, which in turn is surrounded by an impervious base, such as cement.

Referring now to FIG. 1, an in place storm drain system 10 is shown. This system contains no moving parts, is simple and is very inexpensive. The system 10 contains a standpipe 12, usually a plastic such as polyethylene or polyvinyl chloride, having a top section 14 with a top closure 16 at the top areas of the drain system 10, and a bottom section 18 having a plurality of perforations 20. A porous pavement material 21 surrounds the top few inches of the standpipe and the entire top area of the drain system 10. Beneath the porous pavement 21 is a supportive aggregate 22 of coarse rock or the like that extends to the bottom of the standpipe. Hard compressed pavement 24, asphalt or concrete will generally surround the top of the drain system.

Figure 2:
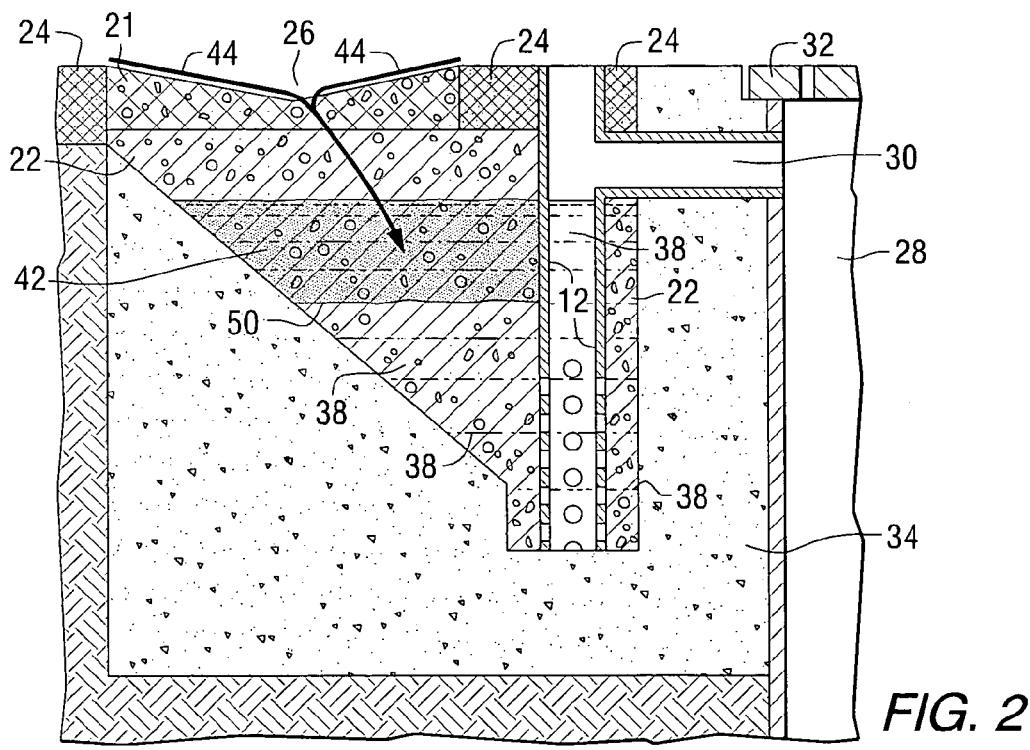
FIG. 2 is a cross-sectional view of the drain system of FIG. 1, but showing liquid flows and how contaminates are confined within the drain system while clear water flows through standpipe perforations and up and out the device.

Under certain circumstances, it might be desirable to have the harder, less porous compressed pavement 24 to better support the standpipe at the top section 14, with a depression 26 in the porous pavement 21 to help catch spills/run off, as shown in FIG. 2. The storm drain 28 connects to the standpipe by a top outlet pipe 30 at a top section of the standpipe. A perforated storm drain cover 32 is partly shown.

FIG. 1 also shows a non-porous base material 34 that is poured into place or placed in the ground 36. The base material 34 surrounds the supportive aggregate 21 which contacts and surrounds the standpipe 12. The base material 34 is usually concrete and helps also hold the supportive aggregate standpipe and porous pavement in place. Any release liquid 40, including runoff water 38 would permeate the porous pavement, usually by capillary action, as shown by arrow 41 to collect inside the device. This released liquid material will then displace water, currently collected inside the device, through perforations 20 at the bottom section 18 of the standpipe 12, as shown in FIG. 1.

The standpipe 12 cover/closure 16 and top outlet pipe 30 should resist the elements and most gasolines, oils and the like, and can be made of plastic, fiberglass, a metal such as aluminum or galvanized steel, or the like. The standpipe will be impervious except for the perforations 20 at the bottom section 18 of the standpipe. The porous pavement 21 is not hot rolled and is from about 15 vol. % to about 50 vol. % porous, preferably from about 20 vol. % to about 35 vol. % porous. Greater than 35 vol. % to 50 vol. % porosity and heavy equipment driving over it could cause cracks or other damage in the porous pavement and stones gravel or other debris could block permeable passageways. Less than about 15 vol. % and viscous oils might not permeate. It's top is not perforated but is porous due to use of medium size asphalt (mineral pitch) or aggregate particles utilizing an adhering adhesive binder of an asphalt, plastic or the like. The particles can have diameters from about 2 mm to about 7 mm, with from about 10 vol. % to 20 vol. % binder and contain less fines and more binder than normal road/paving materials. By contrast the less porous compressed/hot rolled pavement 24 is less than 10 vol. % porous.

FIG. 2 shows a thick top layer of contaminated liquid 42 after an original impurity spill, shown by spill entrance arrows 44, which has permeated the porous pavement 21 at the top of the storm drain system, and aggregate 22 usually by capillary action, to finally rest/float, as shown, on top of the runoff water 38 as top impurities layer 42. The interface between the impurity and water layers is shown as line 50. Most oil, gasoline, or chemical spills involve liquid materials having a specific gravity less than water and will float on water, as shown by spill layer 42. Petroleum (crude oil, earth oil, rock oil), is a complex mixture of paraffin, napthene and aromatic hydrocarbons. They are thick heavy liquids but usually have a lower specific gravity between 0.780 and 0.970 than water at 1.000 at 4° C. Gasoline includes n-heptane at 0.636 (20° C.), iso octane at 0.7026 (20° C.) and the like. Common solvents can include benzene-specific gravity 0.8790 (20° C./4° C.) and ethyl alcohol-specific gravity 0.816 (15.6° C./4° C.). Antifreeze and brake fluid both usually contain ethylene glycol, which has a specific gravity of 1.115 (20° C.). The system will also hold up to about 25 gallons of a material whose specific gravity is greater than that of water, which material can completely displace any water in the device. The liquid impurities 42 will typically have a specific gravity less than about 0.95 at 20° C. vs. water at 4° C. (1.000), the usual range will be from about 0.50 to 0.90 at 20° C. vs. water at 4° C. (1.000). At the point of time shown in FIG. 2, a pump will be used to pump out water 38 inside the standpipe 12 allowing lowering of interface line 50 so that impurities 42 pass through the perforations in the standpipe and are also pumped out of the interior of the standpipe.

If subsequent to the impurity spill, generated as shown by arrows 44, there is a heavy influx of additional storm water, the additional storm water will flow under the liquid impurity layer 42, and flow through the perforations, then up and out the standpipe.

Figure 3:
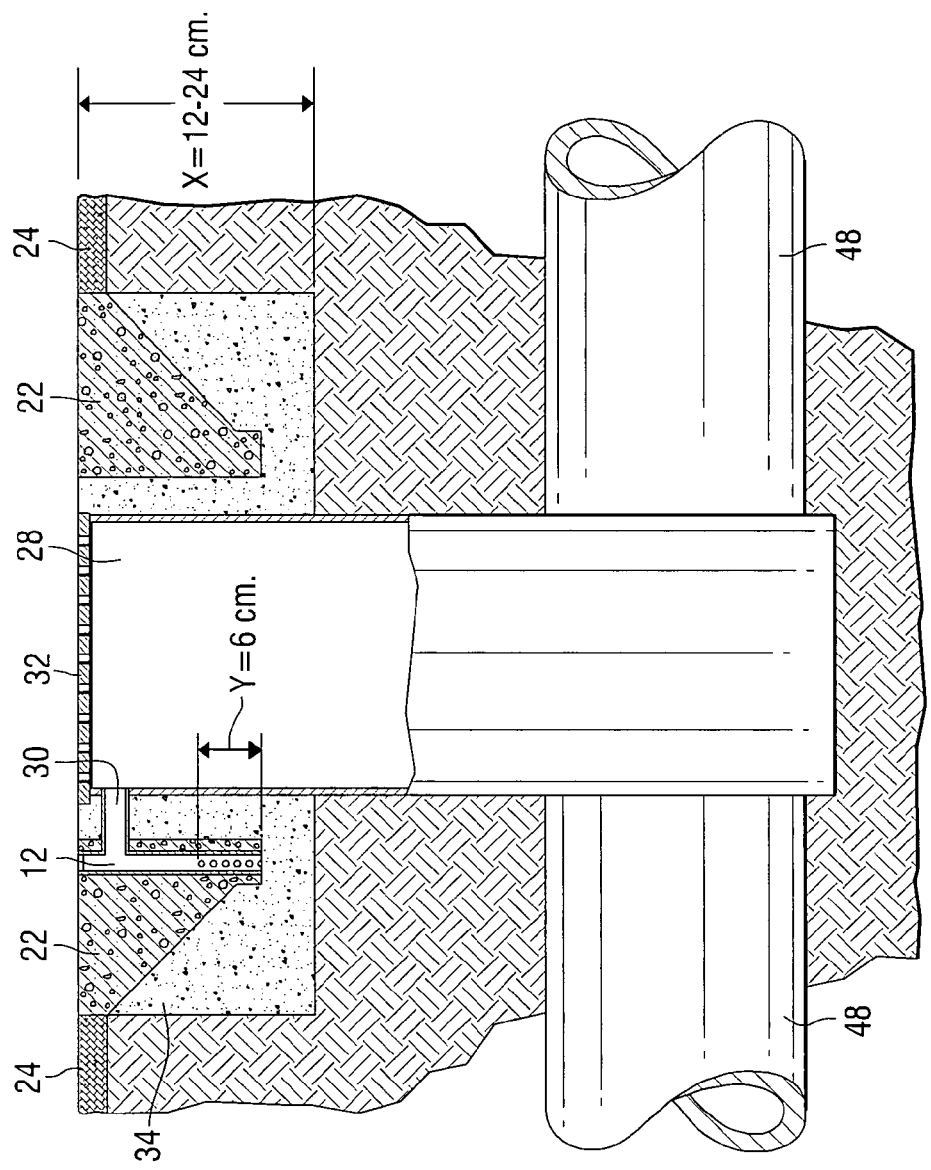
FIG. 3 is a partial cross-sectional view of one embodiment of an in place standpipe connected to a storm drain system, where the storm drain system surrounds the storm drain.

FIG. 3 illustrates one embodiment of an in place standpipe connected to a storm drain system. The storm drain 28 as well as the standpipe 12 is usually circular but can be of a square or other configuration and may be associated with one or more exit conduits 48. As the dimensions on FIG. 3 show, these storm drain systems can be quite small, x=about 12–14 cm deep for total depth of the non-porous base so that they can be easily disposed about potential spillage areas in large numbers and require minimal construction time or effort. Of course they could be made much larger depending on the need, and FIG. 3 is not to be considered any way limiting as to size. The perforated storm drain lid/cover 32 should be thick enough to resist bending, about 2 inches. The lid diameter can be about 2 feet to 3 feet. As can be seen in FIG. 3, only one standpipe 12 is needed for smaller storm drain systems, although more can be used. The size system shown in FIG. 3, remarkably, can hold about 25 gal. (about 94.6 liters), although much larger units can be used. The preferred ratio of length of standpipe X to height of perforations/perforated section from the bottom Y, that is X:Y=3:1 but can vary from about 2:1 to about 4:1. The perforations are preferably circular and the diameter of the perforations should be from about ¼" to ½", to insure that loose asphalt/pourous pavement does not fill the bottom of the standpipe.

The foregoing is considered as illustrative only on the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

Having described the presently preferred embodiments, it is to be understood that the invention may be otherwise embodied within the scope of the appended claims.

What is claimed is:

1. A storm drain system, in place in the ground, for receiving water and liquid impurities comprising;
    (a) a standpipe positioned within the drain system, the standpipe having a top section having a top outlet pipe and a bottom perforated section;
    (b) porous pavement material surrounding the top area of of the storm drain system;
    (c) a non-porous base material deposited in the ground and providing a base for holding the standpipe and porous pavement in place in the ground, where the top outlet pipe of the standpipe connects to a storm drain, so that water and any liquid impurities would permeate the porous pavement, and the water would enter the perforations at the bottom of the standpipe.

2. The storm drain system of claim 1, wherein the liquid impurities have a specific gravity less than water and settle on top of the water outside the standpipe within supportive aggregate under the porous pavement.

3. The storm drain system of claim 1, wherein water and any impurities in the standpipe can be removed and a supportive aggregate is disposed within the non-porous base material, the aggregate contacting the standpipe.

4. The storm drain system of claim 1, wherein water and liquid impurities can permeate the porous pavement by capillary action.

5. The storm drain system of claim 1, wherein the standpipe is made of at least one of polyethylene or polyvinyl chloride.

6. The storm drain system of claim 1, wherein the porous pavement from about 15 vol. % to about 50 vol. % porous and its top is not perforated.

7. The storm drain system of claim 1, wherein the liquid impurities have a specific gravity less than about 0.95 at 20° C. vs. water at 4° C. (1000).

8. The storm drain system of claim 1, wherein the standpipe is circular.

9. The storm drain system of claim 1, wherein the ratio of the length of the standpipe:height perforated section is from 2:1 to 4:1.

10. The storm drain system of claim 1, wherein the perforations in the perforated section are circular and the diameter of the perforations is from about ¼" cm to ½'.

11. The storm drain system of claim 1, wherein the system can hold up to about 25 gal. of liquid, when the liquid impurities are selected from the group consisting of oil, gasoline, chemicals, and mixtures thereof having a specific gravity less than water.

* * * * *

UNITED STATES PATENT AND TRADEMARK OFFICE
CERTIFICATE OF CORRECTION

PATENT NO. : 7,105,086 B2 Page 1 of 1
APPLICATION NO. : 11/046930
DATED : September 12, 2006
INVENTOR(S) : B. George Saliba It is certified that error appears in the above-identified patent and that said Letters Patent is hereby corrected as shown below:

In column 2, line 5, after "vacuum", delete "devise" and insert --device--.

In column 3, line 52, after "heavy", delete "infux" and insert --influx--.

In column 5, line 3 of Claim 10, after "1/4'"", delete "cm".

In column 5, line 3 of Claim 10, after "to", delete "1/2'" and insert --1/2"--.

Signed and Sealed this

Seventh Day of October, 2008

JON W. DUDAS
*Director of the United States Patent and Trademark Office*